United States Patent Office 3,382,230
Patented May 7, 1968

3,382,230
OXYGENATED DERIVATIVES OF METHYL 6-AMINO-6,8-DIDEOXY-1-THIO-D-ERYTHRO-α-D-GALACTO-OCTOPYRANOSIDE AND ETHYL 6-AMINO-6,8-DIDEOXY-1-THIO-D-ERYTHRO-α-D-GALACTO-OCTO-PYRANOSIDE AND PROCESS FOR PRODUCING THE SAME
Barney J. Magerlein, Kalamazoo, Mich., assignor to The Upjohn Company, Kalamazoo, Mich., a corporation of Delaware
No Drawing. Filed July 8, 1966, Ser. No. 563,720
20 Claims. (Cl. 260—210)

ABSTRACT OF THE DISCLOSURE

Oxygenated derivatives of methyl 6-amino-6,8-dideoxy-1-thio-D-erythro-α-D-galacto-octopyranoside and ethyl 6-amino-6,8-dideoxy-1-thio-D-erythro-α-D-galacto-octopyranoside and processes for producing the same. These compounds are useful as intermediates to make antibacterially-active compounds.

---

This invention relates to novel compositions of matter and to processes for the preparation thereof. More specifically, this invention is directed to oxygenated derivatives of methyl 6-amino-6,8-dideoxy-1-thio-D-erythro-α-D-galacto-octopyranoside, which has been given the trivial name methyl α-thiolincosaminide (abbreviated to MTL), and ethyl 6-amino-6,8-dideoxy-1-thio-D-erythro-α-D-galacto-octopyranoside, which has been given the trivial name ethyl α-thiolincosaminide (abbreviated to ETL), and to processes for producing the same.

Methyl α-thiolincosaminide (MTL), as described in U.S. Patent 3,179,565, is obtained by hydrazinolysis of lincomycin. Ethyl α-thiolincosaminide (ETL) is obtained by hydrazinolysis of S-ethyllincomycin. S-ethyllincomycin is also known as lincomycin C, and as U–11,921.

The novel compounds of this invention can be illustratively represented by the following formula:

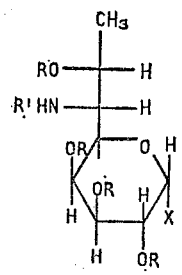

wherein R is hydrogen or a hydrocarbon carboxylic acid acyl radical containing from 2 to 12 carbon atoms, inclusive, and halo-, nitro-, hydroxy-, amino-, cyano-, thiocyano-; and lower-alkoxy hydrocarbon carboxylic acid acyl radical containing from 2 to 12 carbon atoms, inclusive; and R' is R or the acyl radical of 4-n-propyl-L-hygric acid, or 4-ethyl-L-hygric acid; and X is

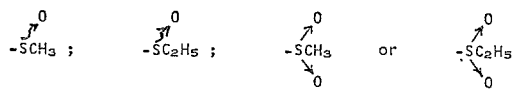

The wavy arrow to the oxygen atom is used to indicate that the oxygen can be up or down.

The term "hydrocarbon carboxylic acid acyl of from two to twelve carbon atoms" whenever used in the specification or claims is intended to mean an acyl corresponding to a hydrocarbon carboxylic acid of from two to twelve carbon atoms, inclusive. Suitable such acids include (a) a saturated or unsaturated, straight or branched chain aliphatic carboxylic acid, for example, acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) a saturated or unsaturated alicyclic carboxylic acid, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) a saturated or unsaturated substituted alicyclic aliphatic carboxylic acid, for example, cyclopentaneacetic acid, cyclopentanepropionic acid, cyclopenteneacetic acid, cyclohexanebutyric acid, methylcyclohexaneacetic acid, and the like; (d) an aromatic carboxylic acid, for example, benzoic acid, toluic acid, naphthoic acid, ethylbenzoic acid, isobutyibenzoic acid, methylbutylbenzoic acid, and the like; and (e) an aromatic-aliphatic carboxylic acid, for example, phenylacetic acid, phenylpropionic acid, phenylvaleric acid, cinnamic acid, phenylpropiolic acid, and naphthylacetic acid, and the like.

The term "halo-, nitro-, hydroxy-, amino-, cyano-, thiocyano-, and lower alkoxy-substituted hydrocarbon carboxylic acid acyl of from two to twelve carbon atoms, inclusive" is intended to means hydrocarbon carboxylic acid acyl as hereinbefore defined which are substituted by one or more halogen atoms, nitro, hydroxy, amino, cyano, thiocyano, or lower alkoxy groups. By "lower alkoxy" is meant an alkoxy group of from one to six carbon atoms, inclusive, for example, methoxy, ethoxy, propoxy, butoxy, amyloxy, hexyloxy, and isomeric forms thereof. Examples of substituted hydrocarbon carboxylic acid acyl falling within the above definition are the acyl corresponding to chloroacetic acid, chloropropionic acid, bromobutyric acid, iodovaleric acid, chlorocyclohexanecarboxylic acid, o-, m-, and p-chlorobenzoic acid, anisic acid, salicylic acid, p-hydroxybenzoic acid, o-, m-, and p-nitrobenzoic acid, cyanoacetic acid, thiocyanoacetic acid, cyanopropionic acid, lactic acid, glycine, ethoxyformic (ethyl hemicarbonic) acid, and the like.

The compounds of this invention are prepared by treating MTL and ETL with an oxidizing agent. In order to prevent the amino function in MTL and ETL from reacting with the oxidizing agent, it is desirable to convert the amino to an amide. Advantageously, this is accomplished by acylating ETL and MTL with the halide or anhydride of a carboxylic acid of not more than 12 carbon atoms, or a halo-, nitro-, hydroxy-, amino-, cyano-, thiocyano-, substituted carboxylic acid, in the presence of an acid-binding agent, for example, a tertiary amine. Suitable acid-binding agents include heterocyclic amines such as pyridine, quinoline and isoquinoline; trialkylamines such as trimethylamine, triethylamine, triisopropylamine, and the like; and N,N-dialkylanilines such as dimethylaniline, diethylaniline and the like; and N-alkylpiperidines such as N-ethylpiperidine, N-methylpiperidine and the like. The preferred base is pyridine. The reaction is advantageously conducted by treating a suspension of either MTL or ETL, depending on the end product desired, in the tertiary amine with the acid halide or anhydride and heating the resulting mixture, if desired, for a short period at a temperature not greater than about 100° C. to complete the reaction. The resulting MTL or ETL ester can be isolated by conventional procedures.

Upon reacting either acylated MTL or acylated ETL with an oxidizing agent, for example, dilute aqueous sodium periodate solution of from about 0.25 to 0.5 molar, there is obtained a mixture of d and l sulfoxide isomers of either the acylated MTL or acylated ETL. The d and l isomers differ in structural configuration at the sulfur atom, i.e., the oxygen is either up or down. These isomers can be separated by conventional procedures, for example, by counter-current distribution or partition chromatography using butanol-water, or methyl ethyl ketone acetone-water as solvent systems.

Deacylated MTL and ETL sulfoxides can be obtained by refluxing MTL and ETL sulfoxides with hydrazine hydrate for about 24 hours. The hydrazine hydrate can be removed by distillation in vacuo to leave a residue. The desired product then can be recovered by treating the residue with ethanol, filtering to remove solids and then evaporating the solvent to give the deacylated product.

Upon reacting acylated MTL and acylated ETL with a stronger oxidizing agent than above, for example, aqueous potassium permanganate, or m-chloroperbenzoic acid, there are obtained the sulfones of acylated MTL and acylated ETL. Unlike the acylated MTL and ETL sulfoxides which occur in two isomeric forms each, acylated MTL and ETL sulfones exist in only one form.

Deacylated MTL and ETL sulfones can be prepared from acylated MTL and ETL sulfones in the manner described above for the preparation of deacylated MTL and ETL sulfoxides.

MTL sulfoxides and sulfone and ETL sulfoxides and sulfone exist either in the non-protonated (free base) form or the protonated (salt) form depending upon the pH of the environment. These compounds form stable protonates (acid addition salts) by neutralization of the free base with an acid or by metathesis between the protonated form of the compound and the anion of an acid. Suitable acids for this purpose include hydrochloric, sulfuric, phosphoric, acetic, succinic, citric, lactic, maleic, fumaric, pamoic, cholic, palmitic, music, camphoric, glutaric, glycolic, phthalic, tartaric, lauric, stearic, salicylic, 3 - phenylsalicylic, 5 - phenylsalicylic, 3 - methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfuric, picric, and like acids. These acid addition salts are useful in upgrading the free base.

The novel compounds of the invention, the $d$ and $l$ isomers of acylated MTL sulfoxide, $d$ and $l$ isomers of MTL sulfoxide, $d$ and $l$ isomers of acylated ETL sulfoxides, $d$ and $l$ isomers of ETL sulfoxides, MTL sulfone, acylated MTL sulfone, ETL sulfone, acylated ETL sulfone, and the acid addition salts of these compounds, are useful for the resolution of racemic acids. For example, MTL sulfoxide can be reacted with racemic acids to form diastereoisomeric acid addition salts which can be separated by fractional crystallization into diastereoisomers from which the optically active acids can be regenerated. The novel compounds of the invention are also useful as intermediates. They react with isocyanates to form urethanes and ureas, and can be used to modify polyurethane resins. For example, the novel compounds of this invention can be reacted with an excess of toluene diisocyanate to form a prepolymer which then can be reacted with the polyol ethers and polyol esters commonly used to form polyurethanes; or they can be mixed with the polyol compound and the mixture then reacted with toluene diisocyanate. The compounds of this invention also can be reacted with ethylene oxide, propylene oxide, and like alkylene oxides to form polyoxyalkylene compounds which can be reacted with toluene diisocyanate to form a polyurethane. The novel compounds of this invention are particularly useful for producing rigid polyurethane foams. They also condense with formaldehyde according to U.S. Patents 2,425,320 and 2,606,155, especially when the thiocyanic acid addition salt is employed to form polymers which are useful as pickling inhibititors. Their fluosilicic acid addition salts are useful as mothproofing agents in accordance with U.S. Patents 1,915,334 and 2,075,359.

Also, the novel MTL sulfoxides and sulfones can be converted to lincomycin sulfoxides and lincomycin sulfone by reacting with a solution of 4-n-propyl-L-hygric acid hydrochloride in anhydrous acetonitrile and triethylamine to which solution is added isobutyl chloroformate. In a similar manner, ETL sulfoxides and ETL sulfone can be converted to lincomycin C sulfoxide and sulfone. Also, lincomycin derivatives can be formed by reacting 4-ethyl-L-hygric acid and MTL and ETL sulfoxides and sulfones in the above reaction.

Such lincomycin derivatives are antibacterially active in vitro against various Gram-positive bacteria. For example, they inhibit the growth of *Staphylococcus aureus*, and, therefore, are useful as a disinfectant on washed and stacked food utensils contaminated with this organism. These compounds also form acid-addition salts with acids as disclosed above for MTL and ETL salts. Such acid-addition salts are useful in the same manner as the base compounds.

The following examples are illustrative of the process and products of the present invention but are not to be construed as limiting. All percentages are by weight and all solvent mixture proportions are by volume unless otherwise noted.

PREPARATION OF LINCOMYCIN

Lincomycin can be prepared in accordance with procedures set out in U.S. Patent 3,086,912.

PREPARATION OF METHYL α-THIOLINCOSAMINIDE

Methyl α-thiolincosaminide can be prepared in accordance with the procedures set out in U.S. Patent 3,179,565.

PREPARATION OF LINCOMYCIN C HYDROCHLORIDE

Lincomycin C hydrochloride, also known as U-11,921, can be prepared in accordance with the procedures set out in the publication by Argoudelis, A. D., and Mason, D. J., Biochemistry, 4, 704–709 (1965). The microorganism disclosed in U.S. Patent 3,086,912 can be used in the fermentation procedure disclosed in the Argoudelis, A. D., et al, publication, supra.

PREPARATION OF ETHYL α-THIOLINCOSAMINIDE

Ethyl α-thiolincosaminide can be prepared in accordance with the procedures set out in the publication by Argoudelis, A. D. and Mason, D. J., Biochemistry, 4, 704–709 (1965) at page 705. This procedure also refers to a publication by Argoudelis et al. in Biochemistry, 4, 698–703 (1965) for the operating conditions of the hydrazinolysis.

PREPARATION OF 4-n-PROPYL-L-HYGRIC ACID HYDROCHLORIDE

Two grams of lincomycin hydrochloride were dissolved in 50 ml. of 6 N hydrochloric acid and refluxed for one-half hour. The mixture was evaporated to dryness and the residue was dissolved in 20 ml. of water and extracted twice with 10 ml. portions of chloroform. The aqueous phase was diluted with 60 ml. of water, extracted twice with 20-ml. portions of 1-butanol, and evaporated to dryness in vacuo. The residue was dissolved in 20 ml. of ethanol and the solution was treated with decolorizing carbon and filtered. To the filtrate was added 100 ml. of ether, and a gummy precipitate which formed was removed by filtration. The filtrate was decolorized with carbon, 1000 ml. of ether was added to it, and the solution was cooled in the refrigerator. The crystals of 4-n-propyl-L-hygric acid hydrochloride which formed were collected by filtration; weight 0.65 gram. Found by titration were pka's of 2.4 and 10, optical rotation $[\alpha]_D^{25}$ —46.5° C. (c. 2.98, water).

*Analysis.* — Calcd. for $C_9H_{17}NO_2 \cdot HCl \cdot \frac{1}{2}H_2O$: C, 49.87; H, 8.84; N, 6.46; Cl, 16.36; O, 18.46. Found: C, 49.35; H, 8.55; N, 6.75; Cl, 16.96; O, 18.39 (by diff).

PREPARATION OF 4-ETHYL-L-HYGRIC ACID HYDROCHLORIDE

Two grams of lincomycin B free base were dissolved in 60 ml. of 6 N hydrochloric acid and heated under reflux for one-half hour. The mixture was evaporated to dryness, and the residue was dissolved in 20 ml. of water and extracted twice with 10-ml. portions of chloroform; the chloroform portions were discarded. The aqueous phase was diluted with 60 ml. of water and extracted twice with 20-ml. portions of 1-butanol; the butanol fractions were discarded. The aqueous solution was evaporated to dryness, and the residue was dissolved in 20 ml. of ethanol, treated with decolorizing carbon and filtered. To the filtrate was added 100 ml. of ether, and the precipitate which formed was removed by filtration. After decolorizing the filtrate with activated carbon, 1000 ml. of ether was added to it, and the solution was cooled in the refrigerator. The crystals of 4-ethyl-L-hygric acid hydrochloride which formed were collected by filtration. Two recrystallizations from water gave colorless crystals of 4-ethyl-L-hygric acid hydrochloride.

*Analysis.*—Calcd. for $C_8H_{15}NO_2 \cdot HCl$: C, 49.65; H, 8.34; N, 7.24; Cl, 18.32. Found: C, 48.54; H, 8.35; N, 7.05; Cl, 18.52.

Lincomycin B free base, also known as U–21,699, can be prepared in accordance with the procedures disclosed in the publication Argoudelis, A. D., et al., Biochemistry, 4, 698–703 (1965). The microorganism and fermentation disclosed in U.S. Patent 3,086,912 can be used to produce the fermentation beer containing lincomycin B.

Example 1.—Methyl α-thiolincosaminide pentaacetate

A mixture of 20 g. of methyl α-thiolincosaminide, prepared as disclosed in U.S. Patent 3,179,565, 150 ml. of pyridine and 100 ml. of acetic anhydride was stirred overnight. The reaction mixture was poured into 1.5 liters of Skellysolve B (isomeric hexanes). The precipitate which formed was separated by filtration and dried in vacuo. The dried residue was stirred well with 500 ml. of water. Crystals which formed were collected and dried in vacuo. This crude crystalline preparation of methyl α-thiolincosaminide pentaacetate was dissolved in 100 ml. of acetone and 350 ml. of water was added to the solution. The crystals of methyl α-thiolincosaminide pentaacetate which formed were collected and dried; yield, 17 g. having a melting point of 207–209° C.

Example 2.—Methyl α-thiolincosaminide pentaacetate sulfoxides

A solution of 1.85 g. of MTL pentaacetate, prepared as described in Example 1, and 8.2 ml. of 0.5 molar sodium periodate in 200 ml. of methanol was permitted to stand at 26° C. for 18 hours. The reaction mixture was filtered and the solvent distilled under vacuum. The crude product from the oxidation was dissolved in methanol, and 8 g. of silica gel (silica gel 0.05–0.20 mm. for chromatography, Merck-Darmstadt) added. The solvent was evaporated under vacuum leaving a residue compound deposited on silica gel as a free-flowing powder. A slurry of 200 g. of silica gel in a mixture of chloroform-methanol (10:1) was poured in a chromatographic tube of 32 mm. diameter. The absorbent was permitted to settle and the solvent drained down to about 1.5 inches of the top of the adsorbent. The silica gel-compound mixture, prepared above, was dusted onto the chromatographic column forming a band at the top of the adsorbent. The column was eluted with chloroform-methanol (10:1) taking 20 ml. fractions. These fractions were monitored by thin-layer chromatography as follows: Two microliters of each fraction was spotted on a 1″ x 3″ micro thin-layer chromatography (TLC) plate coated with silica gel. The TLC plates were developed with chloroform-methanol (10:1) and dried. The plates were sprayed with permanganate-periodate reagent (RU Lemieux and H. F. Bauer, Anal. Chem., 26, 920, 1954). The compounds were visible as yellow spots on a pink background. Fractions showing the same TLC pattern were combined into three fractions, i.e., A, B, and C. Crystallization of the compound from these fractions was induced by scratching with a spatula in the presence of ethyl acetate. The crystals from Fraction A (least polar) weighed 220 mg. and melted at 206–207° C. after recrystallization from ethyl acetate-Skellysolve B (isomeric hexanes). Thin-layer chromatography and elemental analyses suggested that this product was a mixture of starting material and sulfone. The crystals from Fraction A were discarded.

The crystals from Fraction B (intermediate polarity) weighed 595 mg. After recrystallization from ethyl acetate, the crystals from Fraction B weighed 450 mg., melted at 230–232° C. and had an optical rotation $[\alpha]_D^{25} + 265°$ in chloroform.

*Analysis.*—Calcd. for $C_{19}H_{29}O_{11}NS$: C, 47.59; H, 6.10; S, 6.69. Found: C, 47.87; H, 6.53; S, 6.73.

The above analyses established the identity of the crystalline compound isolated from Fraction B as methyl α-thiolincosaminide pentaacetate sulfoxide.

The crystals from the most polar fraction (Fraction C) weighed 1.02 g. These crystals were recrystallized from ethyl acetate to give 520 mg. of crystals having a melting point of 185–186° C., and an optical rotation $$[\alpha]_D^{25} + 138°$$

in chloroform.

*Analysis.*—Calcd. for $C_{19}H_{29}O_{11}NS$: C, 47.59; H, 6.10; S, 6.69. Found: C, 47.40; H, 5.77; S, 6.78.

The above analyses established the identity of the crystalline compound isolated from Fraction C as an isomeric form of methyl α-thiolincosaminide pentaacetate sulfoxide.

Example 3.—Methyl α-thiolincosaminide pentaacetate sulfone

To a solution of 926 mg. of methyl α-thiolincosaminide pentaacetate, as prepared in Example 1, in 15 ml. of methylene chloride was added 850 mg. of m-chloroperbenzoic acid. After 30 minutes, the reaction mixture was washed first with a $KHCO_3$ solution, then with water, and dried over sodium sulfate. Evaporation of the solvent gave 701 mg. of oil which was crystallized from ethyl acetate-Skellysolve B to yield 470 mg. of methyl α-thiolincosaminide pentaacetate sulfone having a melting point of 236–238° C.

*Analysis.*—Calcd. for $C_{19}H_{29}NO_{12}S$: C, 46.05; H, 5.90; N, 2.83. Found: C, 46.09; H, 5.92; N, 2.80.

Example 4

By substituting the methyl α-thiolincosaminide pentaacetate in Example 3 by methyl α-thiolincosaminide pentaacetate sulfoxides as obtained in Example 2, there is obtained methyl α-thiolincosaminide pentaacetate sulfone.

Example 5

By substituting the methyl α-thiolincosaminide in Example 1 by ethyl α-thiolincosaminide, there is obtained ethyl α-thiolincosaminide pentaacetate.

Example 6

By substituting the methyl α-thiolincosaminide pentaacetate in Example 2 by ethyl α-thiolincosaminide pentaacetate, there are obtained the isomeric forms of ethyl α-thiolincosaminide pentaacetate sulfoxides.

Example 7

By substituting the methyl α-thiolincosaminide pentaacetate in Example 3 by ethyl α-thiolincosaminide pentaacetate, there is obtained ethyl α-thiolincosaminide pentaacetate sulfone.

Example 8

By substituting methyl α-thiolincosaminide pentaacetate sulfoxides in Example 4 by ethyl α-thiolincosaminide pentaacetate sulfoxides as obtained in Example 6, there is obtained ethyl α-thiolincosaminide pentaacetate sulfone.

Example 9

The acylated sulfoxides as obtained in Examples 2 and 6, and the acylated sulfones as obtained in Examples 3, 4, 7 and 8 can be deacylated as follows: 1 gram of the acylated material is refluxed for 24 hours in 10 ml. of hydrazine hydrate. The hydrazine hydrate is removed by distillation in vacuo. The residue is shaken with 5 ml. of 95% ethanol and filtered to remove a small amount of solids. Evaporation of the solvent yields a residue of the desired deacylated product.

Example 10

By substituting the acetic anhydride in Example 1 by acetyl chloride, propionyl bromide, butyryl chloride, valeryl chloride, hexanoyl chloride, heptanoyl chloride, and octanoyl chloride, and the pyridine by at least a stoichiometric amount of triethylamine, there are obtained the corresponding MTL pentaacetates, MTL pentapropionates, MTL pentabutyrates, MTL pentavalerates, MTL pentahexanoates, MTL pentaheptanoates, and MTL pentaoctanoates.

Example 11

By substituting the acetic anhydride in Example 1 by propionic, succinic, maleic, and phthalic anhydride, there are obtained the corresponding MTL pentapropionates, MTL penta(hydrogensuccinates), MTL penta(hydrogenmaleates), and MTL penta(hydrogenphthalates).

Example 12

By substituting the methyl α-thiolincosaminide in Example 10 by ethyl α-thiolincosaminide there are obtained the corresponding ethyl α-thiolincosaminide pentaacylates.

Example 13

By substituting the methyl α-thiolincosaminide in Example 11 by ethyl α-thiolincosaminide there are obtained the corresponding ethyl α-thiolincosaminide pentaacylates.

Example 14

By substituting the methyl α-thiolincosaminide pentaacetate in Example 2 by the methyl α-thiolincosaminide pentaacylates obtained in Examples 10 and 11, there are obtained the corresponding methyl α-thiolincosaminide pentaacylate sulfoxides.

Example 15

By substituting the methyl α-thiolincosaminide pentaacetate sulfoxides in Example 4 by the methyl α-thiolincosaminide pentaacylate sulfoxides obtained in Example 14, there are obtained the corresponding methyl α-thiolincosaminide pentaacylate sulfones.

Example 16

By substituting the methyl α-thiolincosaminide pentaacetate in Example 2 by the ethyl α-thiolincosaminide pentaacylates obtained in Examples 12 and 13, there are obtained the corresponding ethyl α-thiolincosaminide pentaacylate sulfoxides.

Example 17

By substituting the methyl α-thiolincosaminide pentaacetate in Example 3 by the ethyl α-thiolincosaminide pentaacylate sulfoxides obtained in Example 16, there are obtained the corresponding ethyl α-thiolincosaminide pentaacylate sulfones.

Example 18

By substituting the methyl α-thiolincosaminide pentaacetate in Example 3 by the methyl α-thiolincosaminide pentaacylates obtained in Examples 10 and 11, there are obtained the corresponding methyl α-thiolincosaminide pentaacylate sulfones.

Example 19

By substituting the methyl α-thiolincosaminide pentaacetate in Example 3 by the ethyl α-thiolincosaminide pentaacylates obtained in Examples 12 and 13, there are obtained the corresponding ethyl α-thiolincosaminide pentaacylate sulfones.

Example 20

The acylated sulfoxides as obtained in Examples 14 and 16, and the acylated sulfones as obtained in Examples 15, 17, 18 and 19 can be deacylated by the procedure of Example 9.

Example 21

To a solution of 1.1 g. of 4-n-propyl-L-hygric acid hydrochloride in 40 ml. of anhydrous acetonitrile and 1.5 ml. of triethylamine cooled to 0° C. is added 0.7 ml. of isobutyl chloroformate. After 20 minutes at 0° C. a solution of 1.8 g. of methyl α-thiolincosaminide sulfoxide in 20 ml. of water is added. The mixture is stirred at 0° C. for one hour and at ambient temperature for 1.5 hours. The acetonitrile is distilled under vacuum and the residue is extracted with methylene chloride. After drying and evaporating the solvent, a gummy residue of the lincomycin analog remains. The residue is dissolved in dilute hydrochloric acid and acetone is added to precipitate the solid hydrochloride salt of lincomycin sulfoxide.

Example 22

By substituting the methyl α-thiolincosaminide sulfoxide in Example 21 by methyl α-thiolincosaminide sulfone cipitate the solid hydrochloride salt of lincomycin sulfoxide.

Example 23

By substituting the methyl α-thiolincosaminide sulfoxide in Example 21 by ethyl α-thiolincosaminide sulfoxide, there is obtained the hydrochloride salt of lincomycin C sulfoxide.

Example 24

By substituting the methyl α-thiolincosaminide sulfoxide in Example 21 by ethyl α-thiolincosaminide sulfone, there is obtained the hydrochloride salt of lincomycin C sulfone.

Example 25

By substituting the 4-n-propyl-L-hygric acid hydrochloride in Example 21 by 4-ethyl-L-hygric acid hydrochloride, there is obtained the hydrochloride salt of lincomycin B sulfoxide.

Example 26

By substituting the 4-n-propyl-L-hygric acid hydrochloride in Example 21 by 4-ethyl-L-hygric acid hydrochloride, and the methyl α-thiolincosaminide sulfoxide by methyl α-thiolincosaminide sulfone, there is obtained the hydrochloride salt of lincomycin B sulfone.

Example 27

By substituting the 4-n-propyl-L-hygric acid hydrochloride in Example 21 by 4-ethyl-L-hygric acid hydrochloride and methyl α-thiolincosaminide sulfoxide by ethyl α-thiolincosaminide sulfoxide there is obtained the hydrochloride salt of ethyl N - (trans-4-ethyl-1-methyl-L-prolyl)α-thiolincosaminide sulfoxide.

Example 28

By substituting the 4-n-propyl-L-hygric acid hydrochloride in Example 21 by 4-ethyl-L-hygric acid hydrochloride and methyl α-thiolincosaminide sulfoxide by ethyl α-thiolincosaminide sulfone, there is obtained the hydrochloride salt of ethyl N - (trans-4-ethyl-1-methyl-L-prolyl)α-thiolincosaminide sulfone.

I claim:
1. A compound selected from the group consisting of the free base and acid addition salts of a compound having the following structural formula:

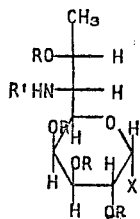

wherein R is hydrogen or a hydrocarbon carboxylic acid acyl radical containing from 2 to 12 carbon atoms, inclusive; and halo-, nitro-, hydroxy-, amino-, cyano-, thiocyano-, and lower alkoxy hydrocarbon carboxylic acid acyl radical containing from 2 to 12 carbon atoms, inclusive; and R' is R or the acyl radical of 4-n-propyl-L-hygric acid, or 4-ethyl-L-hygric acid; and X is

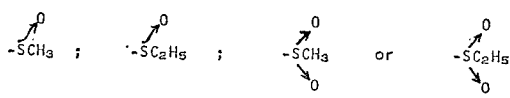

2. Methyl α-thiolincosaminide sulfoxides according to claim 1 having the following structural formula:

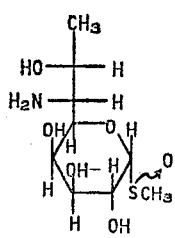

or their acid addition salts.

3. Methyl α-thiolincosaminide sulfone according to claim 1 having the structural formula:

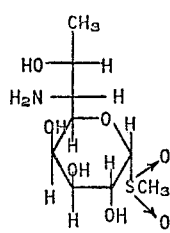

or its acid addition salts.

4. Ethyl α-thiolincosaminide sulfoxides according to claim 1 having the structural formula:

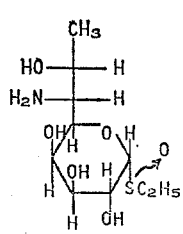

or their acid addition salts.

5. Methyl α-thiolincosaminide pentaacylate sulfoxides, according to claim 1, having the following structural formula:

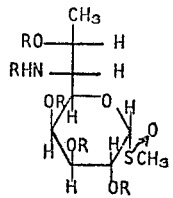

wherein R is a hydrocarbon carboxylic acid acyl radical containing from 2 to 12 carbon atoms, inclusive; and halo-, nitro-, hydroxy-, amino-, cyano-, thiocyano-, and lower alkoxy hydrocarbon carboxylic acid acyl radical containing from 2 to 12 carbon atoms, inclusive.

6. Methyl α-thiolincosaminide pentaacetate sulfoxides, as shown in claim 1.

7. Methyl α-thiolincosaminide pentaacylate sulfone, according to claim 1, having the following structural formula:

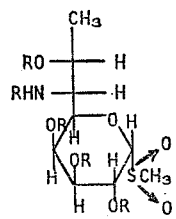

wherein R is as defined in claim 5.

8. Methyl α-thiolincosaminide pentaacetate sulfone, as shown in claim 1.

9. Ethyl α-thiolincosaminide pentaacylate sulfoxides, according to claim 1, having the following structural formula:

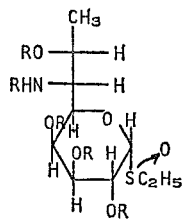

wherein R is as defined in claim 5.

10. Ethyl α-thiolincosaminide pentaacetate sulfoxides, as shown in claim 1.

11. Ethyl α-thiolincosaminide pentaacylate sulfone, according to claim 1, having the following structural formula:

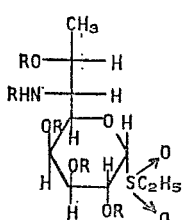

wherein R is as defined in claim 5.

12. Ethyl α-thiolincosaminide pentaacetate sulfone, as shown in claim 1.

13. Lincomycin sulfoxides, according to claim 1, having the following structural formula:

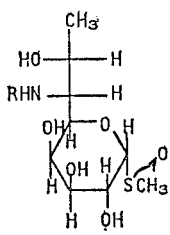

wherein R is the acyl radical of 4-n-propyl-L-hygric acid; or its acid addition salts.

14. Lincomycin sulfone, according to claim 1, having the following structural formula:

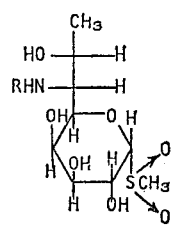

wherein R is the acyl radical of 4-n-propyl-L-hygric acid; or its acid addition salts.

15. Lincomycin B sulfoxides, according to claim 1, having the following structural formula:

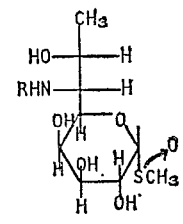

wherein R is the acyl radical of 4-ethyl-L-hygric acid; or its acid addition salts.

16. Lincomycin B sulfone, according to claim 1, having the following structural formula:

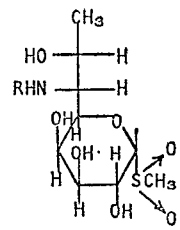

wherein R is the acyl radical of 4-ethyl-L-hygric acid; or its acid addition salts.

17. Lincomycin C sulfoxides, according to claim 1, having the following structural formula:

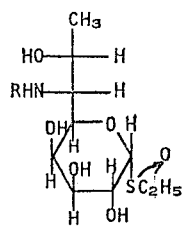

wherein R is the acyl radical of 4-n-propyl-L-hygric acid; or its acid addition salts.

18. Lincomycin C sulfone, according to claim 1, having the following structural formula:

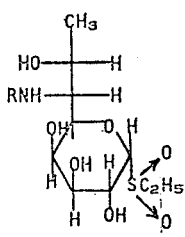

wherein R is the acyl radical of 4-n-propyl-L-hygric acid; or its acid addition salts.

19. Ethyl N-(trans-4-ethyl-1-methyl-L-prolyl)-α-thiolincosaminide sulfoxides, according to claim 1, having the following structural formula:

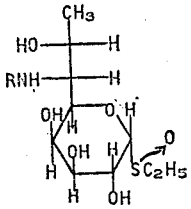

wherein R is the acyl radical of 4-ethyl-L-hygric acid; or its acid addition salts.

20. Ethyl N-(trans-4-ethyl-1-methyl-L-prolyl)-α-thiolincosaminide sulfone, according to claim 1, having the following structural formula:

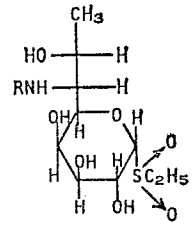

wherein R is the acyl radical of 4-ethyl-L-hygric acid; or its acid addition salts.

References Cited
UNITED STATES PATENTS

| | | | |
|---|---|---|---|
| 2,827,453 | 3/1958 | Baker et al. | 260—210 |
| 3,243,425 | 3/1966 | Whistler | 260—210 |
| 3,284,439 | 11/1966 | Argoudelis | 260—210 |
| 3,300,475 | 1/1967 | Bannister | 260—210 |

LEWIS GOTTS, *Primary Examiner.*

JOHNNIE R. BROWN, *Assistant Examiner.*